United States Patent [19]

Wakabayashi et al.

[11] Patent Number: 4,849,238

[45] Date of Patent: Jul. 18, 1989

[54] FOODSTUFFS HAVING IMPROVED TASTE QUALITY

[75] Inventors: Hidehiko Wakabayashi; Takako Tsubuku; Youichi Ueda; Ryuichi Miyajima, all of Kawasaki, Japan

[73] Assignee: Ajinomoto Co., Inc., Tokyo, Japan

[21] Appl. No.: 176,753

[22] Filed: Apr. 1, 1988

[30] Foreign Application Priority Data

May 15, 1987 [JP] Japan ................................ 62-118529
Jan. 23, 1988 [JP] Japan ................................ 63-13330

[51] Int. Cl.$^4$ ............................................. A23L 1/236
[52] U.S. Cl. .................................... 426/537; 426/548; 426/650; 426/651
[58] Field of Search ................................ 426/537, 548

[56] References Cited

U.S. PATENT DOCUMENTS 4,514,422  4/1985  Yang et al. ............................... 426/3

OTHER PUBLICATIONS

Arctander, Perfume and Flavor Chemicals, vol. II, 1969, Publ. by the Author: Montclair, N.J., Monograph No. 2627.
Furia et al., Fenaroli's Handbook of Flavor Ingredients, vol. I, 1975, CRC Press: Cleveland, Ohio, pp. 432–434.

Primary Examiner—Joseph Golian
Attorney, Agent, or Firm—Oblon, Spivak, McClelland, Maier & Neustadt

[57] ABSTRACT

A foodstuff having improved taste quality comprising a taste-improving amount of a pepper extract, a piperine-containing fraction of pepper or one or more piperines.

2 Claims, No Drawings

FOODSTUFFS HAVING IMPROVED TASTE QUALITY

BACKGROUND OF THE INVENTION

1. Field of the Invention:

The present invention relates to foodstuffs having improved taste quality, more particularly, aftertaste quality.

2. Discussion of the Background:

Taste qualities of foodstuffs change depending on the composition of taste components contained therein. When foodstuffs have miscellaneous tastes or an unpleasant taste, various improvements can be made by adjusting the composition. Among low calorie sweeteners, the use of which has been rapidly growing recently, for example, aspartame is characterized as a sweetener free from a bitter or astringent taste or an irritating taste and having a refreshing sweetness. However, aspartame is somewhat insufficient in rich tasteness in terms of sweet quality. Further, aspartame has a tendency to impart a sweet aftertaste, as is characteristically noted with sweeteners having a high titer. To improve such a sweet quality of aspartame, various proposals have been made (Published Unexamined Japanese Patent Application Nos. 90667/77, 148255/81, 63068/82, 141760/83, etc.).

However, the purpose of improving sweet quality of aspartame and imparting satisfaction comparable to that of sugar have not been sufficiently achieved. Further the method of using these various taste components in combination requires the component used in combination in a weight almost the same as or larger than that of aspartame, in most cases. From an aspect of rendering a low calorie or general purpose use, a further improvement has been desired.

In addition, tastes such as an astringent taste or the like, especially a different flavor or miscellaneous flavors left on the tongue as an aftertaste tend to adversely affect the taste quality of foodstuffs as a whole. In such a case, even though a beforetaste, etc. is of good quality, the taste quality tends to be lowered as a whole due to the unpleasant aftertaste and it becomes necessary to improve the whole taste from the beforetaste to aftertaste.

SUMMARY OF THE INVENTION

Accordingly, it is an object of the present invention to improve the taste quality of foodstuffs, particularly by solving the problem of an unpleasant aftertaste, and to thereby provide foodstuffs having a good taste quality.

It is yet another object of the present invention to provide foodstuffs having improved taste quality, wherein said foods contain a low calorie sweetener.

As a result of extensive investigations to solve the foregoing problems, the present inventors have discovered that by incorporating a trace amount of an extract of pepper such as black pepper, white pepper extract, etc. into foodstuffs to be improved in taste quality, there can be obtained foodstuffs having a high preference, in which unpleasant taste such as an aftertaste, etc. is improved without changing preferable organoleptic properties, physical properties, caloric-content, etc., of the foodstuffs.

The present invention has been accomplished based on such a finding and involves adding to a foodstuff a pepper extract, a piperine-containing fraction or one or more piperines.

DETAILED DESCRIPTION OF THE INVENTION

The pepper extract is obtained by extraction of seeds or seed coats of *Piper nigrum L.* such as black pepper, white pepper, etc., *P. longum L., P. retrofractum Vahl., P. officinarum C.D.C., P. clusii C.D.C.* or other plants belonging to the genus Piper which contain piperines. The extraction is generally carried out with water but it is also possible to add ethanol for bacteriostatic purpose, etc. Further it is also possible to extract using liquid carbon dioxide or carbon dioxide in a super critical state. Furthermore, it is possible to perform the pepper extraction using oil and fat, etc. In the extraction with water, water and/or an alcohol is added to pepper preferably in a 10- to 100-fold amount. During the extraction, heating may or may not be carried out, but in order to enhance extraction efficiency, the extraction is performed for several tens of minutes to several hours (e.g., 30 minutes to 20 hours) preferably with heating to 60° to 100° C.

The thus obtained extract is centrifuged, filtered, etc. to give the pepper extract.

An amount of the pepper extract to be incorporated may vary depending upon the degree of the desired effect, but it is advantageous that the amount be not greater than a threshold limit value, namely, an amount in which a hot taste inherent to pepper is not appreciable. The threshold limit value varies depending upon components to be contained. Generally, the concentration is approximately 1 ppb to 0.1 wt % (1 ppb to 1 ppm, preferably 10 ppb to 100 ppb calculated as piperines) in a concentration dissolved in the final product, in the case of concentrates, the above concentrations will apply to the diluted concentration (in case the solubility changes depending upon composition, temperature, etc. of the solvent, the above general concentration is that dissolved when the consumer tastes the product in ordinary distribution and storage state). The above-mentioned concentration can improve the taste quality without any appreciable hot taste.

It is also desired that the concentration of the piperine-containing fraction fractionated from the pepper extract, namely, a fraction containing one or more selected from piperine, isopiperine, chavicine and isochavicine be not greater than the threshold limit value. The concentration dissolved in the final product is generally 1 ppb to 1 ppm, preferably 10 ppb to 100 ppb, when calculated as peperines. It is also desired that in the case of containing piperines per se in place of the piperine-containing fraction of the pepper extract, the concentration be not greater than the threshold limit value; when the concentration dissolved in the final product is generally 1 ppb to 1 ppm, preferably 10 ppb to 100 ppb, when calculated as piperines, the taste-improving effect is exhibited without any appreciable hot taste inherent to pepper.

A similar effect can also be obtained by incorporating pepper during preparation of foodstuffs and filtering, etc., instead of adding the pepper extract, etc. In short, it is sufficient that the pepper extract, etc. be contained in the final product but a means, time, etc. for the incorporation are not particularly limited.

The taste of foodstuffs, especially a sweet aftertaste, an astringent aftertaste and other unpleasant aftertastes can be improved with the pepper extract, piperine-containing fraction or piperines.

In the case of aspartame, a sweet taste left on the tongue as an aftertaste imparts to those people experienced with the sweetness of sugar, a reduced preference, but in the co-presence of the pepper extract, piperine-containing fraction or piperines, the aftertaste is cut and a taste quality more similar to sugar can be obtained. Further in the case of tea, its aftertaste and astringent taste are restrained and a refreshing taste can be obtained.

In any case, a pleasant rich taste, etc. of foodstuffs is not compromised, and the flavor, hot taste, etc. of pepper are not appreciable. That is, aftertastes of foodstuffs are improved and a refreshing taste quality free from a so called luscious taste, a sharp taste, etc. can be obtained. Accordingly, not only in those cases presenting difficulties in aftertastes but also in cases where the taste of a foodstuff is desired to be improved to a refreshing or light taste, it is effective to incorporate the pepper extract, piperine-containing fraction or piperines.

With respect to application of piperine and chavicine to foodstuffs, the use in combination with chemical substances (oxabicyclooctane derivatives and the like) having an aroma or taste-improving effect is disclosed in U.S. Pat. Nos. 4,197,328, 4,208,308, 4,225,470, 4,229,314, 4,273,662, 4,294,708, 4,198,393 and 4,454,111. However, the effect of improving aftertastes, etc. inherent to piperine and chavicine is not disclosed.

Kinds of foodstuffs to which the present invention may be applied are not particularly limited but as described above, the pepper extract, piperine-containing fraction or piperines exhibit a marked effect in improving aftertastes such as a sweet aftertaste, an astringent aftertaste, etc. Therefore, the present invention is highly effective for foodstuffs which have sweet and astringent components and in which improvement in taste quality is desired. Specific examples of foodstuffs having a sweet taste include various sweeteners (irrespective of forms, such as powders, granules, cubes, pastes, liquid, etc.), beverages such as carbonate beverages, milk beverages, etc.; foods such as candies, fondants, icings, jellies, mousses, chocolates, cookies, cakes, ice creams, sherbets, chewing gums, sweet pickles, dressings, vinegars, sweet wines, etc. Examples of foodstuffs having an astringent taste include tea and foods containing components such as tannin, etc. In the case of containing low calorie sweeteners such as aspartame which is a sweetener having a high titer, alitame, sucrarose, etc., especially in the case of containing aspartame, aftertastes are improved and foodstuffs having a high preference can be obtained. In addition, the low calorie sweetener may also include saccharin, cyclamate, acesulfame, stevioside, ribaudioside, sugar-added stevia, glycyrrhizin, thaumatin, etc. The amount of the pepper extract, piperine-containing fraction or piperines effective for improving the taste quality of low calorie sweeteners varies depending upon various conditions such as the kind or the concentration of sweetener, components used in combination, etc. For example, in the case of aspartame, approximately 1 ppm to 1000 wt % of the pepper extract and approximately 1 ppm to 10 wt % piperine-containing fraction or piperines, based on the weight of aspartame are preferred.

In matters other than foodstuffs, for example, toothpastes, gargles, oral drugs (including herb medicines), etc., the taste quality can be markedly improved by incorporating the pepper extract, piperine-containing fraction or piperines therein. The effective concentration of the pepper extract, piperine containing fraction or piperines can be the same in these other foodstuffs as in the above described foodstuffs.

According to the present invention, the taste quality, especially aftertaste properties of foodstuffs and the like can be markedly improved by incorporating the pepper extract, piperine-containing fraction or piperines therein. The content of these components is in a trace amount so that the taste quality of foodstuffs is not affected as a whole and texture is not damaged. Further in the case of aspartame, etc., sweet beverages and foodstuffs or sweeteners having good quality similar to sugar but having a low caloric content can be provided.

The invention now being generally described, the same will be better understood by reference to the following examples which are not intended to be limiting of the present invention.

EXAMPLES

PREPARATION EXAMPLE 1

Commercially available black pepper (granules, from Salawaku in the Federation of Malaysia), 52.1 g, was ground and boiled at 90° C. for 30 minutes together with water to perform extraction. The extract was centrifuged to remove insoluble matter. Then, the supernatant was freeze dried to give 5.0 g of dry powder.

PREPARATION EXAMPLE 2

Commercially available white pepper (granules, from Salawaku in the Federation of Malaysia), 51.8 g, was treated in a manner similar to Example 1 to give 3.7 g of dry powder.

PREPARATION EXAMPLE 3

To 25.0 g of commercially available black pepper (granules, from Salawaku in the Federation of Malaysia) was added 500 g of 70% ethanol. The mixture was ground with a homogenizer. After allowing to stand overnight, the suspension was filtered and the obtained extract was concentrated under reduced pressure. Ethanol was removed by distillation. The concentrate was filtered and freeze dried to give 1.7 g of dry powder.

PREPARATION EXAMPLE 4

Black pepper (granules, from Tericheli in India), 100.8 g, was ground and heated to reflux for 2 hours together with 1 liter of chloroform. The filtered extract was concentrated under reduced pressure. The solvent was removed by distillation to give 7.1 g of dry powder.

PREPARATION EXAMPLE 5

The extract, 37 mg, obtained in Preparation Example 4 was fractionated with high performance liquid chromatography.
column: Unicil Q 5C18 (manufactured by Gas Chromatography Industry K.K.), inner diameter of 16.7 mm × length of 250 mm
column temperature: 25° C.
eluate: methanol/water = 3/2 (v/v)
eluting rate: 4.0 ml/min
detection: UV absorption at 254 nm
amount of sample: 10 mg Portions of Fraction A corresponding to piperines were collected, concentrated under reduced pressure and then freeze dried to give 4 mg of the piperine fraction.

EXPERIMENT 1

Two samples of (1) 0.04 wt % aqueous solution of aspartame and (2) a solution obtained by adding 2.5 ppm of the extract obtained in Preparation Example 1 to (1) were evaluated by the count method with trained panels of 20 using 5% aqueous solution of sucrose as a control. The results are shown in Table 1 . In the aqueous solution added with the pepper extract, it was evaluated that a sweet aftertaste and luscious taste were restrained and its rich taste was strengthened to thereby markedly improve the quality of aspartame. With the concentration of added extract in this experiment, neither pepper flavor nor hot taste was appreciable.

TABLE 1

|  | Solution (1) | Solution (2) | Significant Difference[*2] |
|---|---|---|---|
| Aftertaste of sweetness[*1] | +1.9 | +0.6 | ++ |
| Luscious taste of sweetness[*] | +1.7 | +0.5 | ++ |
| Rich taste of sweetness[*1] | −1.1 | −0.4 | + |

[*1]Criteria for evaluation
−3 very weak
−2 considerably weak
−1 somewhat weak
0 same as sucrose
+1 somewhat strong
+2 considerably strong
+3 very strong
[*2]Significant difference
++ significant difference in 1% peril rate
+ significant difference in 5% peril rate
− no significant difference

EXPERIMENT 2

Two samples of (1) 0.04 wt % aqueous solution of aspartame and (2) a solution obtained by adding 1.5 ppm of the extract obtained in Preparation Example 4 to (1) were evaluated by the count method with trained panels of 20 using 5% aqueous solution of sucrose as a control. The results are shown in Table 2. In the aqueous solution added with the pepper extract, it was evaluated that a sweet aftertaste and luscious taste were restrained and its rich taste was strengthened thereby to markedly improve the taste quality of aspartame. With the added concentration in this experiment, neither pepper flavor nor hot taste was appreciable.

TABLE 2

|  | Solution (1) | Solution (2) | Significant Difference[*2] |
|---|---|---|---|
| Aftertaste of sweetness[*1] | +1.9 | +0.5 | ++ |
| Luscious taste of sweetness[*1] | +1.7 | +0.7 | ++ |
| Rich taste of sweetness[*1] | −1.1 | −0.5 | + |

As criteria for evaluation, those similar to Experiment 1 (Table 1 ) were used.

EXPERIMENT 3

Two samples of (1) 0.04 wt % aqueous solution of aspartame and (2) a solution obtained by adding 50 ppb of the extract obtained in Preparation Example 5 to (1) were evaluated by the count method with trained panels of 20 using 5% aqueous solution of sucrose as a control. The results are shown in Table 3. In the aqueous solution added with the pepper extract, it was evaluated that a sweet aftertaste and luscious taste were restrained and its rich taste was strengthened to thereby markedly improve the taste quality of aspartame. With the added concentration in this experiment, neither pepper flavor nor hot taste was appreciable.

TABLE 3

|  | Solution (1) | Solution (2) | Significant Difference[*2] |
|---|---|---|---|
| Aftertaste of sweetness[*1] | +1.9 | +0.2 | ++ |
| Luscious taste of sweetness[*1] | +1.7 | +0.4 | ++ |
| Rich taste of sweetness[*1] | −1.1 | −0.5 | + |

As criteria for evaluation, those similar to Experiment 1 (Table 1 ) were used.

EXPERIMENT 4

Five samples of (1) a coffee solution containing 5% of sugar, (2) a coffee solution containing 0.025 wt % of aspartame prepared so as to have sweetness equivalent to (1), (3) a coffee solution obtained by adding 5 ppm of the extract obtained in Preparation Example 1 to (2), (4) a coffee solution obtained by adding 1.5 ppm to the chloroform extract obtained in Preparation Example 4 to (2) and a coffee solution obtained by adding 50 ppb of the piperine fraction obtained in Preparation Example 5 to (2) were prepared. With respect to Samples (2), (3), (4) and (5), the 3 point discernment test was performed by trained panels of 15 using Sample (1) as a control. The results are shown in Table 4. Sample (2) was significantly discernable but Samples (3), (4) and (5) are not distinguished from each other. It was noted that by adding a very small amount of pepper extract, the chloroform extract and the piperine fraction, the taste quality of aspartame became very similar to sugar. With the added concentration in this experiment, neither pepper flavor nor hot taste was appreciable.

TABLE 4

| Sample | Number of Correct Answer | Significant Difference[*2] |
|---|---|---|
| 2 | 11 | ++ |
| 3 | 6 | − |
| 4 | 8 | − |
| 5 | 6 | − |

As criteria for the significant difference, those similar to Experiment 1 (Table 1) were used.

EXPERIMENT 5

Using (1) a simple aqueous solution containing 0.04 wt % of aspartame as a control, three of (2) the pepper extract obtained in Preparation Example 1 , (3) the chloroform extract obtained in Preparation Example 4 and (4) the piperine fraction obtained in Preparation Example 5 were added to (1), respectively, varying concentrations. These Samples were evaluated by trained panels of 5. The results are shown in Table 5. The luscious taste was restrained with Sample (2) in 0.1 to 10 ppm, with Sample (3) in 10 ppb to 5 ppm and with Sample (4) in 10 ppb to 1 ppm. With these concentrations, neither pepper flavor nor hot taste was appreciable.

TABLE 5

| Sample (2) | Concentration | 0.01 ppm | 0.1 ppm | 10 ppm | 100 ppm |
|---|---|---|---|---|---|
|  |  | ± | + | ++ | ++* |

TABLE 5-continued

| Sample (3) | Effect Concentration Effect | 5 ppb ± | 50 ppb + | 5 ppm ++ | 50 ppm ++* |
|---|---|---|---|---|---|
| Sample (4) | Concentration Effect | 1 ppb ± | 10 ppb + | 1 ppm ++ | 10 ppm ++* |

*The effect was noted but a hot taste was appreciable. Criteria for evaluation:
As compared to the control, its luscious aftertaste:
± does not change appreciably
+ is restrained
++ is strongly restrained

EXPERIMENT 6

With respect to 0.04 wt % aspartame aqueous solution and a solution added with 30 ppm of the extract obtained in Preparation Example 2, evaluation was performed. With the solution added with the pepper extract, a sweet aftertaste and a luscious sweetness were restrained and effects similar to Experiment 1 were noted.

EXPERIMENT 7

With respect to 0.04 wt % aspartame aqueous solution and a solution added with 5 ppm of the extract obtained in Preparation Example 3, evaluation was performed. The effects similar to Experiment 1 were noted.

EXPERIMENT 8

Two samples of (1) 0.002 wt % aqueous solution of alitame and (2) a solution obtained by adding 2.5 ppm of the extract obtained in Preparation Example 1 to (1) were evaluated by the count method with trained panels of 20 in a manner similar to Experiment 1, using 5% aqueous solution of sucrose as a control. The results are shown in Table 6. In the aqueous solution added with the pepper extract, it was evaluated that a sweet aftertaste and a luscious taste were restrained and its rich taste was strengthened to thereby markedly improve the taste quality of alitame.

TABLE 6

|  | Solution (1) | Solution (2) | Significant Difference |
|---|---|---|---|
| Aftertaste of sweetness | +1.6 | +0.9 | + |
| Luscious taste of sweetness | +2.0 | +0.9 | ++ |
| Rich taste of sweetness | −1.4 | −0.8 | + |

EXPERIMENT 9

Two samples (1) 0.0007 wt % aqueous solution of sucrarose and (2) a solution obtained by adding 2.5 ppm of the extract obtained in Preparation Example 1 to (1) were evaluated by the count method with trained panels of 20 in a manner similar to Experiment 1, using 5% aqueous solution of sucrose as a control. The results are shown in Table 6. In the aqueous solution added with the pepper extract, it was evaluated that a sweet aftertaste and a luscious taste were restrained and its rich taste was strengthened to thereby markedly improve the taste quality of alitame.

TABLE 7

|  | Solution (1) | Solution (2) | Significant Difference |
|---|---|---|---|
| Aftertaste of sweetness | +1.0 | +0.4 | + |
| Luscious taste of sweetness | +1.5 | +0.4 | ++ |
| Rich taste of sweetness | −1.2 | −0.5 | + |

EXPERIMENT 10

Samples of (1) a tea solution containing 0.025 wt % of aspartame and (2) a tea solution obtained by adding 5 ppm of the extract obtained in Preparation Example 1 to (1) were prepared. With respect to Samples (1) and (2), the 2 point comparison test was performed by trained panels of 25. Twenty out of the 25 of the panel evaluated that Sample (2) had a weaker astringent taste. It was noted that by adding a very small amount of the pepper extract, the astringent taste of tea was significantly restrained and a refreshing taste was obtained.

EXAMPLE 1

Table sweetener (granules):

TABLE 8

|  | Invention | Control |
|---|---|---|
| Aspartame | 1.70 | 1.70 |
| Maltitol | 84.87 | 84.90 |
| Anhydrous lactose | 13.40 | 13.40 |
| Pepper extract of Preparation | 0.03 | — |
|  |  | (wt) |

The composition described above was granulated using water as a binder (moisture content of 1% or less) to prepare a granulated table sweetener.

Control for the invention also showed a sweetness degree of 4 (1 g corresponds to sweetness obtained with 4 g of sugar). The two kinds of granules obtained were added to coffee, tea and plain yoghurt and organoleptic evaluation was performed by the 2 point comparison method with trained panels of 10, using a sucrose control having a sweetness equivalent thereto. The results are shown in Table 9. Each of the granules was added to coffee, tea and yoghurt, respectively, in the same amount (1.5 g/100 ml).

TABLE 9

|  | Aftertaste of Sweetness | Luscious Taste of Sweetness | Rich Taste of Sweetness |
|---|---|---|---|
| Coffee: |  |  |  |
| Invention | +0.4 | +0.7 | −0.5 |
| Control | +1.2 | +1.4 | −1.4 |
| Tea: |  |  |  |
| Invention | +0.8 | +0.6 | −0.9 |
| Control | +1.6 | +1.0 | −1.6 |
| Plain yoghurt: |  |  |  |
| Invention | −0.1 | −0.3 | −0.4 |
| Control | +0.8 | +0.9 | −1.3 |

As criteria for the evaluation, criteria similar to Experiment 1 (Table 1) were used. In any of the systems, it was noted that by adding a very small amount of the pepper extract, the taste quality of aspartame was markedly improved.

EXAMPLE 2

Lemon lime carbonate beverage

TABLE 10

|  | Invention | Control 1 | Control 2 |
| --- | --- | --- | --- |
| Sugar | — | 100 g | — |
| Aspartame | 0.5 | — | 0.5 |
| Pepper extract of Preparation Example 1 | 0.005 | — | — |
| Citric acid | 1.25 | 1.25 | 1.25 |
| Sodium citrate | 0.5 | 0.5 | 0.5 |
| Lemon lime essence | 1.0 | 1.0 | 1.0 |

Soda was added to make the whole amount 1 liter. By the composition described above lemon lime carbonate beverages were prepared. With respect to the three kinds of carbonate beverages, organoleptic evaluation was performed by the 2 point comparison method with trained panels of 10, using Control 1 (sugar-added beverage as a control). The results are shown in Table 11.

TABLE 11

| Sample | Aftertaste of Sweetness | Luscious Taste of Sweetness | Rich Taste of Sweetness |
| --- | --- | --- | --- |
| Invention | +0.4 | +0.5 | −0.7 |
| Control 2 | +1.8 | +1.2 | −2.0 |

As criteria for the evaluation, criteria similar to Experiment 1 (Table 1) were used. In any of the systems, it was noted that by adding a very small amount of the pepper extract, the taste quality of aspartame was markedly improved.

EXAMPLE 3

Lemon lime carbonate beverage:

TABLE 12

|  | Invention 1 | Control 1 | Control 2 | Invention 2 |
| --- | --- | --- | --- | --- |
| Sugar | — | 100 g | — | — |
| Aspartame | 0.5 | — | 0.5 | 0.5 |
| Chloroform extract of Preparation Example 4 | 0.0015 | — | — | — |
| Citric acid | 1.25 | 1.25 | 1.25 | 1.25 |
| Sodium citrate | 0.5 | 0.5 | 0.5 | 0.5 |
| Lemon lime essence | 1.0 | 1.0 | 1.0 | 1.0 |
| Piperine fraction of Preparation Example 5 | — | — | — | $5.0 \times 10^{-5}$ |

Soda was added to make the whole amount 1 liter. By the composition described above lemon lime carbonate beverages were prepared. With respect to the four kinds of carbonate beverages obtained, organoleptic evaluation was performed by the 2 point comparison method with trained panels of 10, using Control 1 (sugar-added beverage). The results are shown in Table 13.

TABLE 13

|  | Aftertaste of Sweetness | Luscious Taste of Sweetness | Rich Taste of Sweetness |
| --- | --- | --- | --- |
| Invention 1 | +0.4 | +0.6 | −0.6 |
| Control 2 | +1.8 | +1.2 | −2.0 |
| Invention 2 | +0.1 | +0.6 | −0.9 |

As criteria for the evaluation, criteria similar to Experiment 1 (Table 1) were used. It was noted that by adding very small amounts of the chloroform extract and the pepper extract, the taste quality of aspartame was markedly improved.

The invention now being fully described, it will appreciated by one of ordinary skill in the art that numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for improving the after taste of a foodstuff sweetened with aspartame, which comprises:
    adding to said foodstuff a pepper extract, a piperine-containing fraction, or at least one piperine, in an amount in which the hot taste thereof is not appreciable, said amount being 10 ppb to 100 ppb, calculated based on the piperine content, and said foodstuff is sweetened with aspartame.

2. A method according to claim 1, wherein said pepper extract is an extract of pepper with water, an alcohol, or carbon dioxide in a liquid or supercritical state.

* * * * *